United States Patent [19]

Matsumoto

[11] Patent Number: 5,183,243
[45] Date of Patent: Feb. 2, 1993

[54] FLUID-FILLED ELASTIC MOUNT HAVING CAULKED PORTION FOR SEALING OFF FLUID CHAMBER

[75] Inventor: Nobuo Matsumoto, Nagoya, Japan
[73] Assignee: Tokai Rubber Industries, Ltd., Japan
[21] Appl. No.: 711,996
[22] Filed: Jun. 6, 1991

[30] Foreign Application Priority Data

Jun. 12, 1990 [JP] Japan .................. 2-153375

[51] Int. Cl.$^5$ .............................. F16M 1/00
[52] U.S. Cl. .................. 267/140.13; 267/140.11
[58] Field of Search .......... 267/140.1 A, 140.1 R, 267/35; 248/562, 636, 638; 180/300, 312

[56] References Cited

U.S. PATENT DOCUMENTS

| | | | |
|---|---|---|---|
| 4,607,828 | 8/1986 | Bodin et al. | 267/140.1 A |
| 4,700,931 | 10/1987 | Eberhard et al. | 248/562 |
| 4,721,292 | 1/1988 | Saito | 267/140.1 |
| 4,787,609 | 11/1988 | Dan et al. | 248/562 |
| 4,880,215 | 11/1989 | Katayama et al. | 267/35 |
| 4,905,955 | 3/1990 | Brizzoleri et al. | 267/140.1 |
| 4,907,786 | 3/1990 | Okazaki et al. | 248/636 |
| 4,921,201 | 5/1990 | Jouadé | 248/562 |
| 4,925,162 | 5/1990 | Kojima | 267/140.1 |
| 4,997,168 | 3/1991 | Kato | 267/140.1 |
| 4,997,169 | 3/1991 | Nakamura et al. | 248/562 |

FOREIGN PATENT DOCUMENTS 57-9340 1/1982 Japan .
0266242 11/1988 Japan .................. 267/140.1

Primary Examiner—Robert J. Oberleitner
Assistant Examiner—Chris Schwartz
Attorney, Agent, or Firm—Parkhurst, Wendel & Rossi

[57] ABSTRACT

A fluid-filled elastic mount including a first and a second support member elastically connected by an elastic body interposed between, a cylindrical connecting member secured to an outer surface of the elastic body, and a closure member fitted on the connecting member. The closure member cooperates with the elastic body to define a fluid chamber filled with a non-compressible fluid. The fluid chamber is divided by a partition structure supported by the closure member, into a pressure-receiving chamber and a variable-volume equilibrium chamber. A sealing rubber layer is sandwiched between the connecting and closure members, in a direction perpendicular to the load-receiving direction of the mount, assuring fluid-tight sealing of the fluid chamber. The second support member includes a caulking portion which retains the connecting and closure members in the load-receiving direction. A method of manufacturing the fluid-filled elastic mount as described above is also disclosed.

9 Claims, 5 Drawing Sheets

FLUID-FILLED ELASTIC MOUNT HAVING CAULKED PORTION FOR SEALING OFF FLUID CHAMBER

BACKGROUND OF THE INVENTION

1. Field of the Invention

The present invention relates generally to a fluid-filled elastic mount adapted to dampen or isolate vibrations applied thereto, based on flow of a non-compressible fluid contained therein, and more particularly to such a fluid-filled elastic mount which exhibits excellent fluid-tightness of a fluid chamber filled with the fluid, assuring a high degree of durability. The invention is also concerned with a method of manufacturing such a fluid-filled elastic mount as described above.

2. Discussion of the Prior Art

An elastic mount is known as a vibration damping member interposed between two members of a vibration system, for flexibly connecting these two members. As one type of the elastic mount, there is known a so-called fluid-filled elastic mount as disclosed in laid-open Publication No. 57-9340 of unexamined Japanese Patent Application, which has a pressure-receiving chamber and a variable-volume equilibrium chamber which are filled with a suitable non-compressible fluid. The pressure-receiving chamber is partially defined by an elastic body for flexibly connecting two support structures fixed to the above two members, and a pressure of the fluid in this chamber changes due to elastic deformation of the elastic body upon application of vibrations to the mount. The equilibrium chamber is partially defined by a flexible diaphragm, which allows a volumetric change of this chamber due to its elastic deformation, so as to avoid a pressure change of the fluid therein. These pressure-receiving and equilibrium chambers communicate with each other through an orifice passage. This fluid-filled elastic mount is capable of providing an excellent vibration damping effect which cannot be obtained by the elasticity of the elastic body alone, based on resonance of the fluid flowing through the orifice passage. Thus, the fluid-filled elastic mount of the above type is favorably used as an engine mount for a motor vehicle, for example.

In manufacturing the fluid-filled elastic mount as disclosed in the above-identified publication, a cylindrical connecting member is secured by vulcanization to an outer circumferential surface of the elastic body, and an opening of the connecting member is fluid-tightly closed by an appropriate closure member, whereby a fluid chamber is formed between the elastic body and the closure member. This arrangement facilitates the formation of the fluid chamber (i.e., the pressure-receiving and equilibrium chambers), and the filling of the fluid chamber with the fluid. To assure sufficient fluid-tightness of the fluid chamber formed in the elastic mount, it is required to provide a high degree of fluid-tight seal between relevant engaging portions of the closure member and the connecting member upon assembling thereof.

In the known fluid-filled elastic mount, the closure member and the connecting member are assembled together by a caulking technique. More specifically, an open end portion or caulking portion of one of these closure and connecting members is caulked against an open end portion of the other member, so that the open end portion of the other member is gripped by the caulking portion of the above-indicated one member, in the axial direction of the mount. In this manner, the closure member is assembled with the connecting member, with a sealing rubber layer sandwiched between the engaging portions of these members, thereby assuring fluid-tight sealing between these portions.

In the fluid-filled elastic mount with the connecting and closure members assembled by the caulking technique, the vibrations are applied between the connecting and closure members, in the axial direction in which the gripping force of the caulking portion of the above-indicated one member is applied to the end portion of the other member. Therefore, the caulking engagement between the connecting and closure members may be gradually loosened due to the applied vibrations, resulting in reduction in the gripping force of the caulking portion. Since the elastic mount of the above type relies on the gripping force of the caulking portion for giving fluid-tight sealing between the connecting and closure members, the reduced gripping force tends to result in deterioration in fluid-tightness of the fluid chamber, causing a problem of leakage of the fluid from the fluid chamber. Thus, it is difficult for the known fluid-filled elastic mount to have a sufficiently high degree of durability.

SUMMARY OF THE INVENTION

It is therefore a first object of the present invention to provide an improved fluid-filled elastic mount which exhibits excellent fluid-tightness of a fluid chamber formed in the mount, assuring sufficient durability.

It is a second object of the invention to provide a method of manufacturing such a fluid-filled elastic mount as described above.

The first object may be attained according to one aspect of the present invention, which provides a fluid-filled elastic mount for flexibly connecting two members, comprising: (a) a first support member fixed to one of the two members to be flexibly connected; (b) an elastic body having a generally truncated conical shape and including a small-diameter end portion and a large-diameter end portion, the first support member being secured to the small-diameter end portion of the elastic body; (c) a cylindrical connecting member secured to an outer circumferential surface of the large-diameter end portion of the elastic body; (d) a closure member having a generally cylindrical shape closed at one axial end, and including a cylindrical wall portion which is fitted on the connecting member such that an opening of the closure member is fluid-tightly closed by the elastic body, the closure member cooperating with at least the elastic body to define a fluid chamber filled with a non-compressible fluid; (e) a flexible diaphragm secured to the closure member so as to partially define the fluid chamber; (f) a sealing rubber layer which is formed on at least one of an outer circumferential surface of the connecting member, and an inner circumferential surface of the cylindrical wall portion of the closure member, such that the sealing rubber layer is sandwiched between the connecting member and the closure member in a direction perpendicular to a load-receiving direction in which vibrations are applied to the elastic mount; (g) a second support member which is spaced apart from the first support member in the load-receiving direction, and fixed to the other of the two members to be flexibly connected, the second support member being fitted on the closure member and including a caulked portion which retains the connecting member and the closure member in the load-receiving direction; (f) a partition structure supported by the closure member so a to extend in a direction substantially perpendicular to the load-receiving direction, the partition structure dividing the fluid chamber into a pressure-receiving chamber partially defined by the elastic body so that a pressure of the fluid in the pressure-receiving chamber changes due to elastic deformation of the elastic body upon application of the vibrations in the load-receiving direction, and an equilibrium chamber partially defined by the flexible diaphragm so that a volumetric change in the equilibrium chamber is allowed by elastic deformation of the flexible diaphragm; and (g) means for defining an orifice passage for fluid communication between the pressure-receiving and equilibrium chambers.

In the fluid-filled elastic mount constructed as described above according to the present invention, the connecting member secured to the outer circumferential surface of the elastic body is assembled with the closure member which cooperates with the elastic body to define the fluid chamber (pressure-receiving and equilibrium chambers), such that fluid-tight sealing between the connecting and closure members is established with the sealing rubber layer sandwiched by and between the facing surfaces of the two members which are opposed to each other in the direction perpendicular to the load-receiving direction. In this arrangement, the sealing rubber layer is pressed by the connecting and closure members in the direction perpendicular to the load-receiving direction in which the vibrations are applied between these members. Accordingly, the present fluid-filled engine mount does not suffer from reduction in the fluid-tightness of the fluid chamber filled with the fluid, and exhibits excellent durability.

The second object may be attained according to another aspect of the invention, which provides a method of manufacturing the fluid-filled elastic mount as defined above, comprising the steps of: (a) preparing an inner unit consisting of the first support member, the elastic body an the connecting member, such that the first support member is secured to the small-diameter end portion of the elastic body, and such that the connecting member is secured to the outer circumferential surface of the large-diameter end portion of the elastic body; (b) preparing the closure member having the cylindrical wall portion to be fitted on the connecting member, the cylindrical wall portion having a diameter which gradually increases toward the opening of the closure member, the sealing rubber layer being formed on the inner circumferential surface of the cylindrical wall portion of the closure member; (c) preparing the partition structure so that the orifice passage is defined by the partition structure; (d) disposing the cylindrical wall portion of the closure member radially outwardly of the connecting member, with a peripheral portion of the partition structure interposed between the closure member and the connecting member in an axial direction of the elastic mount, and subsequently drawing the cylindrical wall portion of the closure member radially inwards so that the cylindrical wall portion is forced against the outer circumferential surface of the connecting member with the sealing rubber layer sandwiched therebetween, whereby the partition structure is supported by the closure member and the connecting member, such that the pressure- receiving chamber and the variable-volume equilibrium chamber are formed on the opposite sides of the partition member; and (e) fitting the caulked portion of the second support member on the cylindrical wall portion of the closure member, such that the caulked portion is caulked to retain the cylindrical wall portion and the connecting member in the axial direction of the mount.

According to the method of the present invention, the cylindrical wall portion of the closure member which is to be fitted on the connecting member is first formed in tapered configuration, thereby making it easy to position the cylindrical wall portion radially outwardly of the connecting member. Thereafter, the cylindrical wall portion of the closure member is caulked or drawn, so that the wall portion is easily press-fitted on the outer circumferential surface of the connecting member. Thus, according to the present method, the assembling of the closure member with the connecting member can be easily achieved, assuring significantly improved efficiency in the manufacture of the fluid-filled elastic mount.

BRIEF DESCRIPTION OF THE DRAWINGS

The above and other objects, features and advantages of the present invention will become more apparent by reading the following description of a presently preferred embodiment of the invention, when considered in connection with the accompanying drawings, in which.

DETAILED DESCRIPTION OF THE PREFERRED EMBODIMENT

Figure 1:
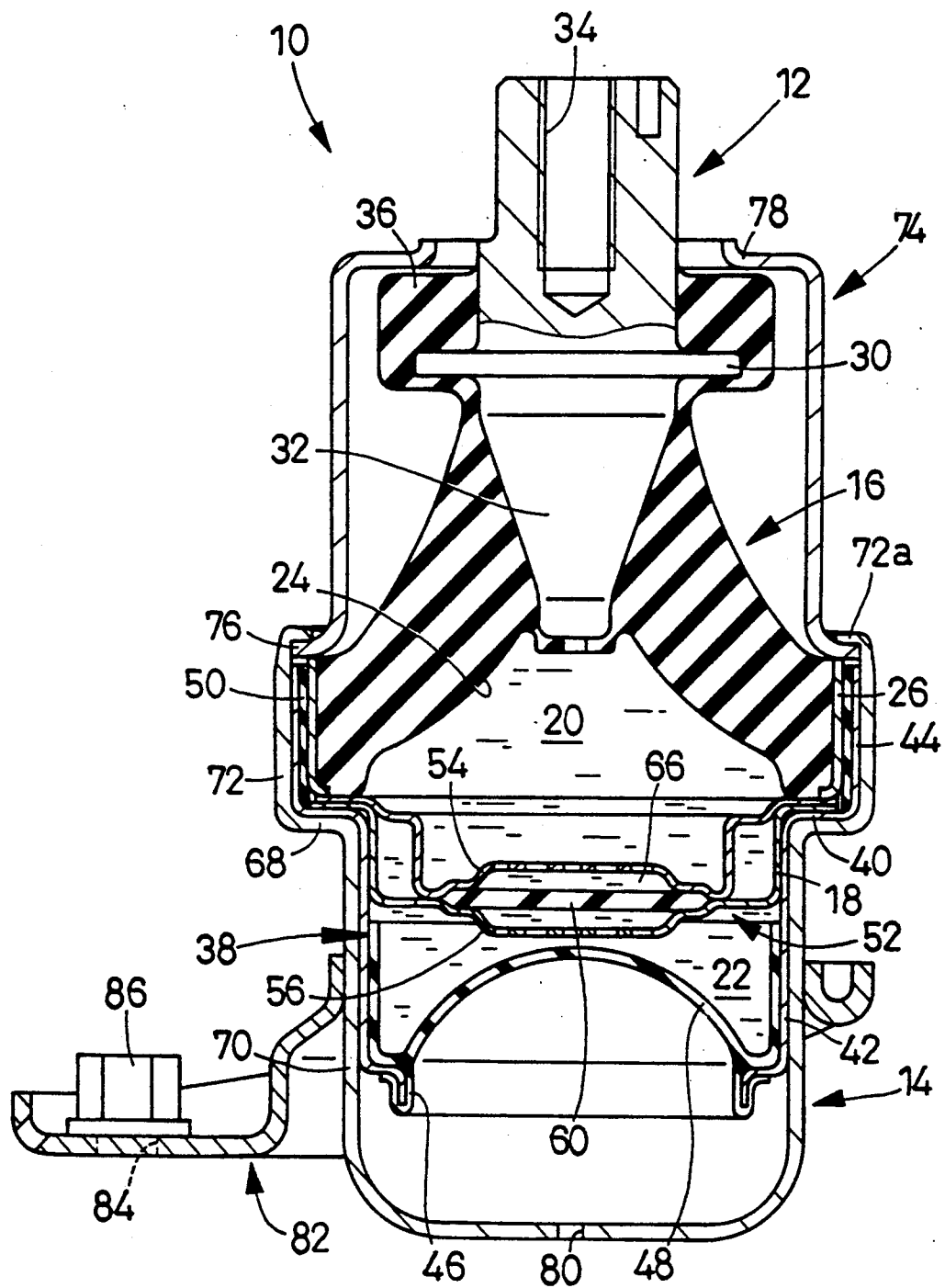
FIG. 1 is an elevational view in axial cross section of one embodiment of a fluid-filled elastic mount of the present invention in the form of an engine mount for a motor vehicle.

Referring first to FIG. 1 showing a vehicle engine mount 10 as one embodiment of the fluid-filled elastic mount of this invention, reference numerals 12 and 14 denote a first and a second rigid support member, respectively. These first and second support members 12, 14 are spaced apart from each other by a suitable distance in a load-receiving direction in which vibrations are received by the engine mount 10. Between the first and second support members 12, 14, there is formed an elastic body 16 so that the two members 12, 14 are elastically connected to each other by the elastic body 16. The engine mount 10 has a pressure-receiving chamber 20 and a variable-volume equilibrium chamber 22 formed therein, and an orifice passage 18 for fluid communication between the two chambers 20, 22. The engine mount 10 is installed on a vehicle such that the first support member 12 is fixed to an engine unit of the vehicle while the second support member 14 is fixed to a body of the vehicle, whereby the engine unit is flexibly mounted on the vehicle body. In this condition, the engine mount 10 provides a high vibration damping effect due to flow of a fluid through the orifice passage 18, with respect to vibrations applied in the direction in which the first and second support members 12, 14 are opposed to each other, i.e., in the vertical direction as viewed in FIG. 1.

Figure 2:
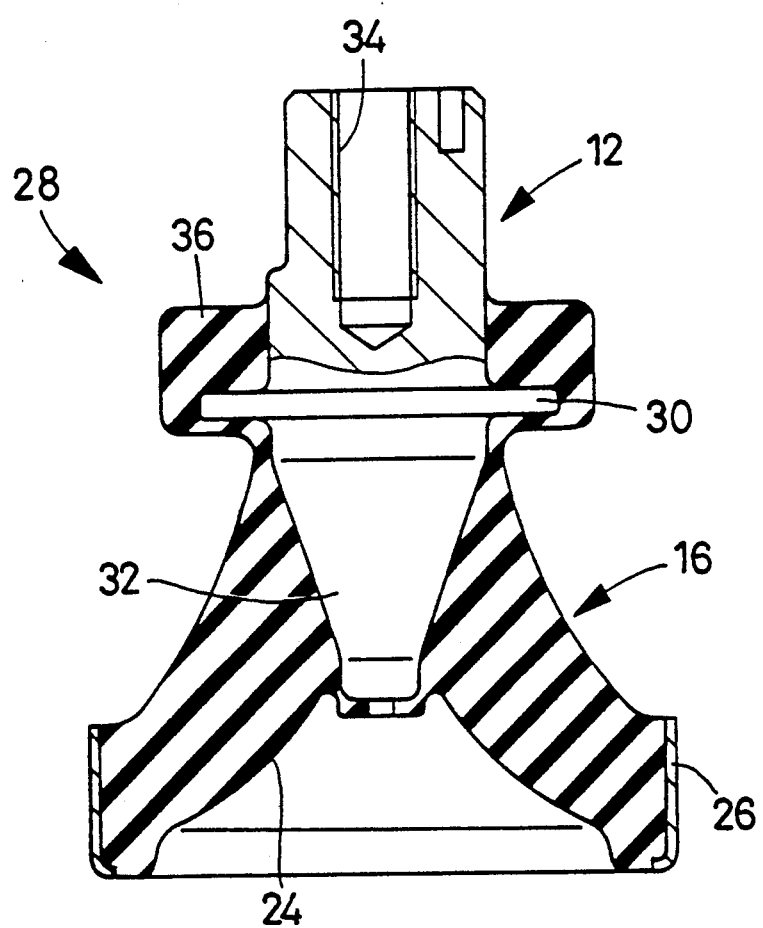
FIG. 2 is an axial cross sectional view showing an inner unit of the engine mount of FIG. 1, which is prepared by vulcanization of an unvulcanized rubber material to form an elastic body of the mount.

More specifically, the elastic body 16 assumes a generally truncated conical shape, and has a cavity 24 which is open in the large-diameter end face thereof. As shown in FIG. 2, the lower portion of the first support member 12 is secured by vulcanization to the small-diameter end portion of the elastic body 16. On the other hand, a cylindrical connecting member 26 is secured by vulcanization to the outer circumferential surface of the large-diameter end portion of the elastic body 16. Thus, the elastic body 16, the first support member 12 and the connecting member 26 are assembled together by means of vulcanization, to thereby provide an inner unit 28 as shown in FIG. 2.

The first support member 12 of the inner unit 28 is a solid rod-like member made of metal, and is formed integrally with a stopper portion 30 which protrudes radially outwards from the axially intermediate portion of the member 12. The first support member 12 also includes a tapered portion 32 which forms a greater part of the lower half thereof and whose diameter gradually decreases toward one of the axially opposite ends of the member 12. The first support member 12 is secured to the elastic body 16 with the tapered portion 32 axially embedded in the small-diameter end portion of the elastic body 16. On the stopper portion 30 of the first support member 12, there is formed a suitable thickness of a rubber layer 36 as an integral part of the elastic body 16. The first support member 12 further has a threaded or tapped hole 34 which is open on the other axial end remote from the .tapered portion 32, and at which the support member 12 is fixed to the engine unit of the vehicle.

Figure 3:
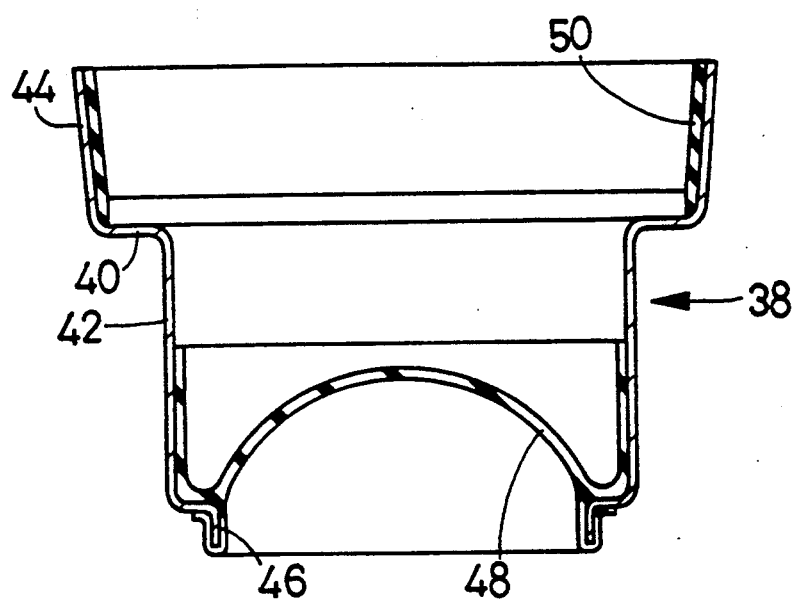
FIG. 3 is an axial cross sectional view showing a closure member of the engine mount of FIG. 1.

As shown in FIG. 1, the inner unit 28 is assembled with a generally cylindrical closure member 38 closed at one axial end, such that the closure member 38 is fitted on the large-diameter portion of the elastic body 16, and is fixed to the outer surface of the connecting member 26. Referring to FIG. 3, the closure member 38 has a stepped cylindrical wall including a shoulder portion 40 formed at the axially intermediate portion thereof, and a small-diameter and a large-diameter portion 42, 44 formed on the opposite sides of the shoulder portion 40. The closure member 38 is open at one axial end of the large-diameter portion 44, and the small-diameter portion 42 has an open end 46. A thin-walled flexible diaphragm 48 made of a rubber material is secured by vulcanization to the inner surface of the closure member 38 so as to close the open end 46, as shown in FIG. 3. Further, a sealing rubber layer 50 having a suitable thickness is fixedly formed over substantially the entire area of the inner circumferential surface of the large-diameter portion 44 of the closure member 38.

The inner unit 28 is assembled with the closure member 38 such that the large-diameter portion 44 of the closure member 38 is fixedly fitted on the outer surface of the connecting member 26 of the inner unit 28. In this condition, the sealing rubber layer 50 is sandwiched (under pressure) between the large-diameter portion 44 of the closure member 38, and the connecting member 26, such that the members 38, 26 are superposed on the rubber layer 50 in the radial direction of the mount. In this arrangement, the opening of the closure member 38 is fluid-tightly closed by the inner unit 28, assuring fluid-tight sealing between the closure member 38 and the connecting member 26.

Figure 5:
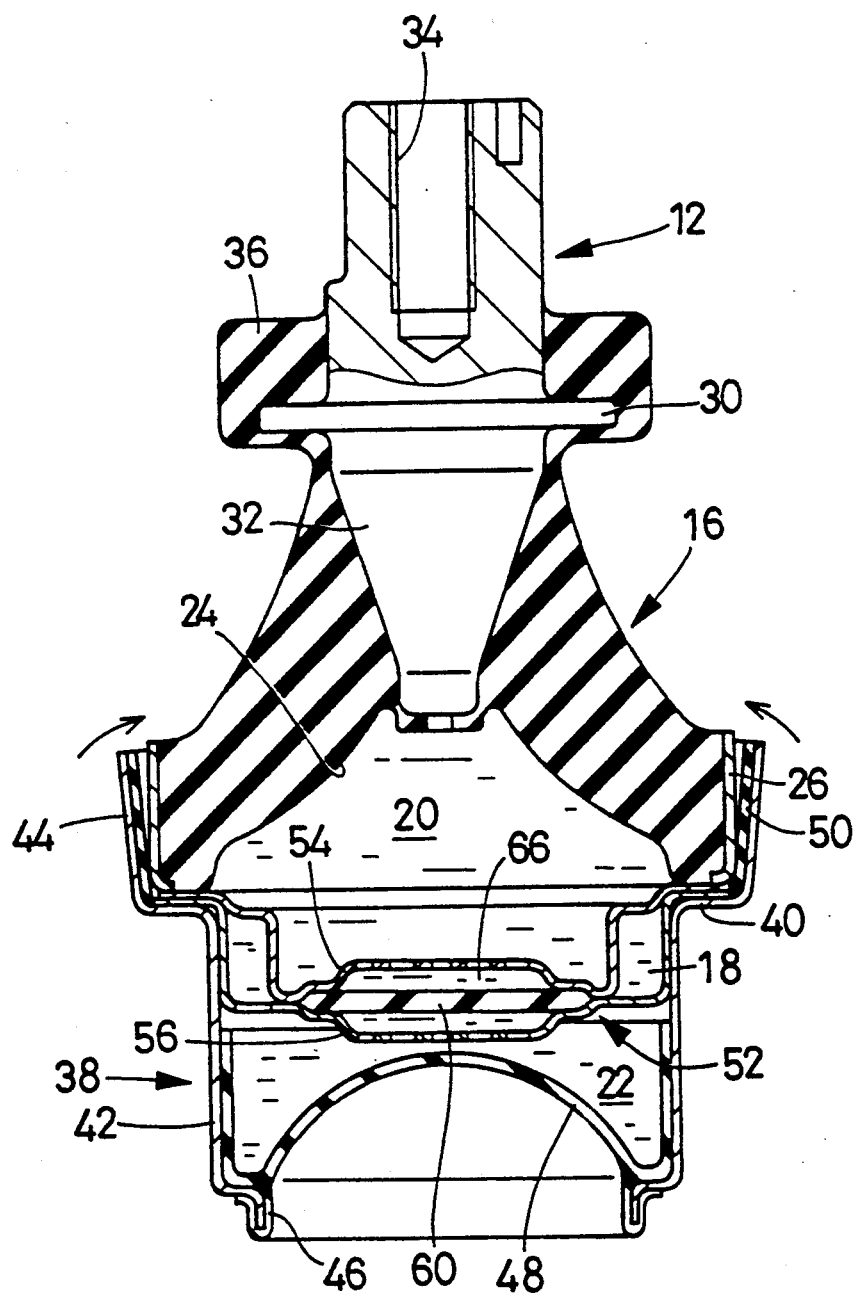
FIG. 5 is an elevational view in axial cross section, illustrating the inner unit as assembled with the closure member and the partition member.

As is apparent from FIG. 3, the large-diameter portion 44 of the closure member 38 is originally tapered such that the diameter of the same portion 44 gradually increases toward the open end of the closure member 38. As shown in FIG. 5, the large-diameter end portion of the elastic body 16 wit the connecting member 26 is received in the large-diameter portion 44 of the closure member 38. Then, the large-diameter portion 44 is subject to a drawing operation so that the same portion 44 is fixedly fitted on the outer surface of the connecting member 26. Namely, the original tapered shape of the large-diameter portion 44 facilitates insertion of the elastic body 16 and the connecting member 26 into the same portion 44, and also facilitates the drawing operation as described above.

Figure 4:
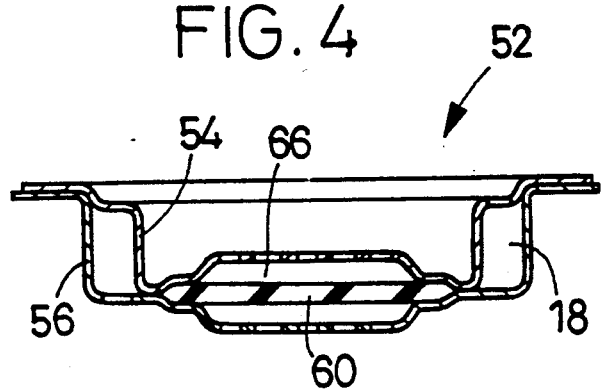
FIG. 4 is an axial cross sectional view showing a partition structure of the engine mount of FIG. 1.

Within the closure member 38, there is accommodated partition means in the form of a generally circular partition structure 52, which includes generally hat-shaped first and second partition members 54, 56 that are superposed on each other in the axial direction of the engine mount 10, as shown in FIG. 4. The orifice passage 18 indicated above is formed in a radially outer or peripheral portion of the partition structure 52, so as to extend a suitable length in the circumferential direction of the mount 10, between the facing surfaces of cylindrical walls of the first and second partition members 54, 56. In a radially inner portion of the partition structure 52, there is formed a generally flat space 66 which is defined between bottom walls of the first and second partition members 54, 56, and which accommodates a flexible film 60 made of a rubber material, for example. The flat space 66 is divided into two sections by the flexible film 60.

The partition structure 52 described above is inserted within the closure member 38, prior to assembling of the closure member 38 with the inner unit 28. Thereafter, the closure member 38 is assembled with the inner unit 28, so that the partition structure 52 is retained at its outer peripheral portion by and between the shoulder portion 40 of the closure member 38 and the corresponding axial end of the connecting member 26, as shown in FIG. 5. Thus, the partition structure 52 is fixedly supported by the connecting and closure members 26, 38 so as to generally extend within the closure member 38 in a direction substantially perpendicular to the axis of the engine mount 10.

The partition structure 52 provided as described above serves to divide the space defined by the closure member 38 and the inner unit 28, into two axially opposite sections, that is, the pressure-receiving chamber 20 formed on the side of the first support member 12, and the equilibrium chamber 22 formed on the side of the flexible diaphragm 48. The pressure-receiving chamber 20 is partially defined by the elastic body 16, whereby a pressure of the fluid in the chamber 20 varies due to the deformation of the elastic body 16 upon application of vibrations to the engine mount 10, based on the deformation of the elastic body 16. On the other hand, the equilibrium chamber 22 is partially defined by the flexible diaphragm 48, which allows a volumetric change of the equilibrium chamber 22 due to its elastic deformation, to thereby absorb a pressure change in this chamber 22.

The fluid filling the pressure-receiving and equilibrium chambers 20, 22 is a suitable non-compressible fluid such as water, alkylene glycol, polyalkylene glycol or silicone oil. The filling of the pressure-receiving and equilibrium chambers 20, 22 with such a non-compressible fluid is accomplished by assembling the closure member 38 and partition structure 52 with the inner unit 28, within a mass of the fluid.

The orifice passage 18 formed in the radially outer portion of the partition structure 52 communicates at its opposite ends with the pressure-receiving chamber 20 and the equilibrium chamber 22, respectively, so that the fluid is allowed to flow between the two chambers 20, 22 through the orifice passage 18. The flat space 66 formed in the radially inner portion of the partition structure 52 also communicates at one of the two sections thereof with the pressure-receiving chamber 20, and at the other section with the equilibrium chamber 22, through holes formed through the bottom walls of the partition members 54, 56. Accordingly, the pressures of the fluid masses in the pressure-receiving and equilibrium chambers 20, 22 act on the opposite major surfaces of the flexible film 60, whereby the fluid is substantially allowed to flow between the pressure-receiving and equilibrium chambers 20, based on elastic deformation or displacement of the flexible film 60.

The cross sectional area, length, and other parameters of the orifice passage 18 are suitably determined so that the engine mount 10 provides a comparatively high damping effect for the input vibrations in a low frequency range, such as engine shakes, based on flow of the fluid through the orifice passage 18. Further, the size of the holes which communicate with the flat space 66 and pressure-receiving chamber 20, and the elasticity of the flexible film 60, for example, are suitably determined so that the engine mount 10 exhibits a sufficiently low dynamic spring constant with respect to the input vibrations in a high frequency range, such as booming noise, based on the fluid flows within the flat space 66 due to the elastic deformation of the flexible film 60.

Figure 6:
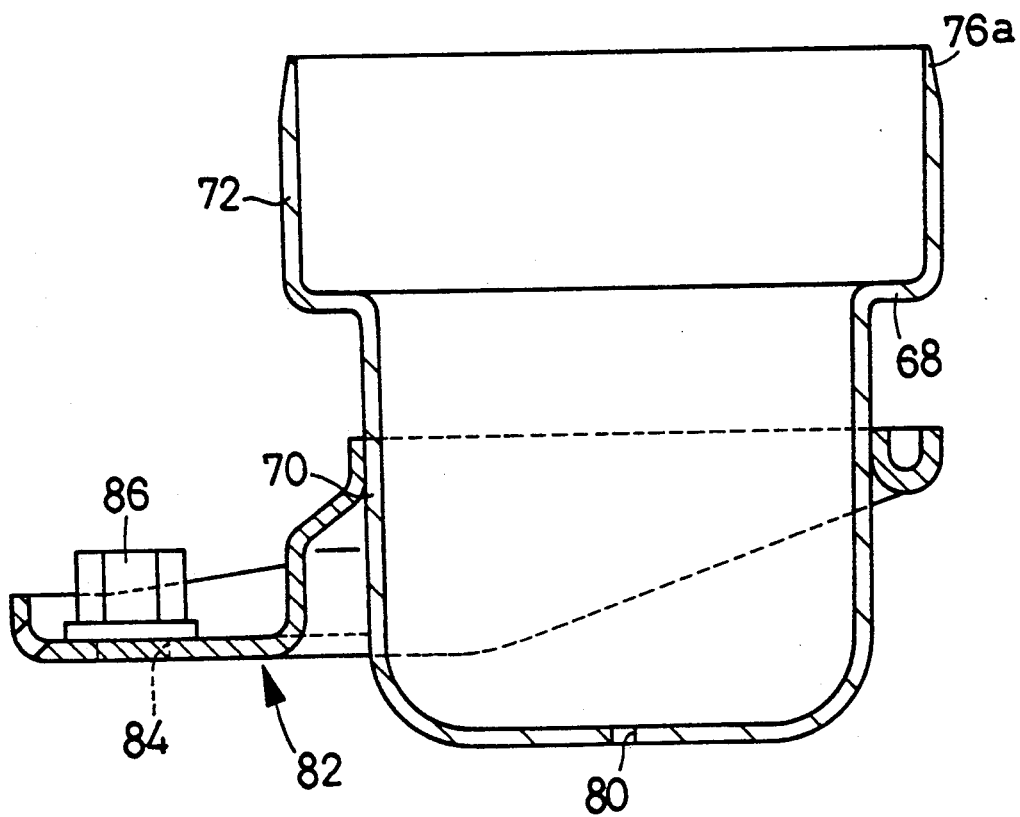
FIG. 6 is an axial cross sectional view showing a second support ember of the engine mount of FIG. 1.

The second support member 14 indicated above is secured to the assembly of the inner unit 28 and the closure member 38, such that the support member 14 is fitted on the outer circumferential surface of the closure member 38. This second support member 14 assumes a generally cylindrical shape closed at one axial end as shown in FIG. 6, and has a larger wall thickness and greater dimensions than those of the closure member 38. Like the closure member 38, the second support member 14 has a stepped cylindrical wall including a shoulder portion 68 formed at the axially intermediate portion thereof, and a small-diameter and a large-diameter portion 70, 72 formed on the opposite sides of the shoulder portion 68. The second support member 14 has an opening at one axial end of the large-diameter portion 72. The second support member 14 has a bottom wall through which is formed a through-hole 80 which permits the interior of the support member 14 to communicate with the ambient atmosphere.

The second support member 14 described above is fitted on the closure member 38 so as to cover the same, as shown in FIG. 1. Subsequently, an open end portion of the large-diameter portion 72 of the second support member 14 is bent so as to provide an inward flange 72a which extends radially inwards from the axial open end of the support member 14. In this manner, the second support member 14 is caulked against the closure member 38, such that the large-diameter portion 44 of the closure member 38 and the connecting member 26 are axially retained by and between the shoulder portion 68 and the inward flange 72a of the large-diameter portion 72 of the support member 14. Namely, the connecting member 26 is fixed to the large-diameter portion 44 of the closure member 38 by caulking of the second support member 14 with respect to the closure member 38. In this case, the connecting member 26 is prevented from slipping off in the axial direction away from the closure member 38. It will be understood from the above description that in the instant embodiment, the large-diameter portion 72 and the shoulder portion 68 of the second support member 14 constitute a caulked portion which functions to fix the connecting member 26 to the closure member 38.

As illustrated in FIGS. 1 and 6, a generally annular mounting bracket 82 is fitted on and welded to the small-diameter portion 70 of the second support member 14, such that the bracket 82 extends radially outwards from the support member 14. This mounting bracket 82 has a plurality of mounting holes 84 formed therethrough, and a corresponding number of nuts 86 welded to its portions through which the mounting holes 84 are formed. Upon installation of the elastic mount in position, the mounting bracket 82, and the second support member 14, are fixed to the vehicle body by means of bolts screwed to the nuts 86 through the holes 84.

Radially outwardly of the first support member 12, there is disposed a generally cylindrical stopper member 74 made of metal, which surrounds the lower portion of the first support member 12 embedded in the elastic body 16. The stopper member 74 has an outward flange 76 formed at one of its axially opposite open ends which is nearer to the second support member 14. The stopper member 74 is fixedly attached to the second support member 14, such that the outward flange 76 is gripped by and between the caulked inward flange 72a of the second support member 14, and the corresponding ends of the closure member 38 and the connecting member 26.

The stopper member 74 extends from the second support member 14 toward the first support member 12 in the axial direction of the mount, and is provided with an inward flange 78 formed at the axial open end thereof remote from the second support member 14. The inner flange 78 extends radially inwards, i.e., toward the first support member 12. The inward flange 78 is located axially outwardly of the stopper portion 30 of the first support member 12. With the engine mount 10 installed in place on the vehicle, the weight of the engine unit acts on the first support member 12, causing the elastic body 16 to be compressively deformed, whereby the inward flange 78 of the stopper member 14 is spaced from the stopper portion 30, with a suitable axial spacing therebetween. In this condition, the amount of relative displacement of the first and second support members 12, 14 in the direction away from each other, and the amount of resultant deformation of the elastic body 16 are limited by abutting contact of the inward flange 78 with the stopper portion 30 through the rubber layer 36.

As described above, the thus constructed engine mount 10 is interposed between the engine unit and the vehicle body, such that the first and second support members 12, 14 are respectively fixed to the engine unit and the vehicle body. In operation, a vibrational load is applied to the engine mount 10 thus installed, primarily in the direction in which the first and second support members 12, 14 are opposed to each other.

The vibrational load applied between the first and second support members 12, 14 is applied between the connecting member 26 secured to the outer circumferential surface of the elastic body 16, and the large-diameter portion 44 of the closure member 38 fitted on the connecting member 26, so as to cause shearing stresses in the axial direction of the mount between the connecting member 26 and the large-diameter portion 44. In this engine mount 10, the fluid-tight sealing between the connecting member 26 and the large-diameter portion 44 of the closure member 38 is secured by the sealing rubber layer 50, which is sandwiched between the members 26, 44 in the direction perpendicular to the axis of the mount. It follows that the vibrational load is applied to the engine mount 10 in the direction perpendicular to the direction in which the connecting member 26 and the closure member 38 are forced against the sealing rubber layer 50 for the fluid-tight sealing therebetween.

Accordingly, the vibrational load applied to the engine mount 10 will not directly cause any deformation of the connecting and closure members 26, 38, which may result in deterioration of the fluid-tight sealing between these members 26, 38. This means that the engine mount 10 does not suffer from reduction in fluid-tightness with respect to the non-compressible fluid contained therein. Thus, the instant engine mount 10 is able to maintain its initial fluid-tightness for the fluid contained therein, assuring a high degree of durability.

Further, the engine mount 10 as described above does not suffer from reduction in the fluid-tightness for the fluid contained therein, even if the caulked portion of the second support member 14 is loosened or deformed, for example. Therefore, even where the stopper member 74 is supported by the caulked portion of the second support member 14 as in the instant embodiment, the engine mount 10 is free from reduction in its fluid-tightness, which may otherwise occur due to a shock applied to the calked portion through the stopper member 74 upon abutting contact of the flange 78 with the stopper portion 30 to limit relative displacement between the first and second support members 12, 14.

In manufacturing the thus constructed engine mount 10, the large-diameter portion 44 of the closure member 38 is formed in tapered configuration, and is disposed radially outwardly of the connecting member 26. Then, the drawing operation is effected to caulk the large-diameter portion 44 against the outer circumferential surface of the connecting member 26. Thus, the operation for press-fitting the large-diameter portion 44 on the connecting member 26 can be easily accomplished, assuring significantly improved efficiency in the manufacture of the engine mount 10.

While the present invention has been described in its presently preferred embodiment, for illustrative purpose only, it is to be understood that the invention is not limited to the precise details of the illustrated embodiment.

In the illustrated embodiment, the sealing rubber layer 50 adapted to function as a fluid-tight seal between the connecting member 26 and the closure member 38 is formed on the inner circumferential surface of the closure member 38. However, such a sealing rubber layer may be formed on the outer circumferential surface of the connecting member 26, in addition to or in place of the sealing rubber layer 50.

In the illustrated embodiment, the stopper member 74 is fixedly supported by the caulked portion of the second support member 14. However, the stopper member 74 may be eliminated from the fluid-filled elastic mount of the invention.

While the second support member 14 of the illustrated embodiment takes the form of a generally cylindrical member closed at one axial end, the second support member 14 may be a cylindrical member which is constituted by a cylindrical member which is caulked to retain the connecting member 26 and the closure member 38, in the axial direction of the mount.

The construction of the partition structure 52, and the construction for supporting the partition structure 52 with respect to the closure member 38 are not limited to those of the illustrated embodiment.

Further, the method of manufacturing the fluid-filled elastic mount according to the present invention is by no means confined to that of the illustrated embodiment. For example, the closure member 38 may be formed as a non-tapered cylindrical member having a larger diameter than the connecting member 26. In this case, the closure member 38 is first disposed radially outwardly of the connecting member 26, and the closure member 38 is then drawn to reduce its diameter so that the closure member 38 is fitted on the outer circumferential surface of the connecting member 26.

It will be understood that the invention may be embodied with various other changes, modifications and improvements which may occur to those skilled in the art, without departing from the spirit and scope of the invention defined in the following claims.

What is claimed is:

1. A fluid-filled elastic mount for flexibly connecting two members, comprising:
   a first support member fixed to one of the two members to be flexibly connected;
   an elastic body having a generally truncated conical shape and including a small-diameter end portion and a large-diameter end portion, said first support member being secured to said small-diameter end portion of said elastic body;
   a cylindrical connecting member secured to an outer circumferential surface of said large-diameter end portion of said elastic body;
   a closure member having a generally cylindrical shape, and including a first and a second cylindrical wall portion, said first cylindrical wall portion being fitted on said connecting member such that an opening of said second cylindrical wall portion is fluid-tightly closed by said elastic body, said second cylindrical wall portion cooperating with at least said elastic body to define a fluid chamber filled with a non-compressible fluid;
   a flexible diaphragm secured to said second cylindrical wall portion of said closure member so as to partially define said fluid chamber;
   a sealing rubber layer which is formed on at least one of an outer circumferential surface of said connecting member, and an inner circumferential surface of said first cylindrical wall portion of said closure member, such that said sealing rubber layer is sandwiched between said connecting member and said closure member in a direction perpendicular to a load-receiving direction in which vibrations are applied to the elastic mount;
   a second support member which is spaced apart from said first support member in said load-receiving direction, and fixed to the other of said two members to be flexibly connected, said second support member being fitted on said closure member and including a caulked portion which retains said connecting member and said first cylindrical wall portion of said closure member in said load-receiving direction;

a partition structure supported by said closure member so as to extend in a direction substantially perpendicular to said load-receiving direction, said partition structure dividing said fluid chamber into a pressure-receiving chamber partially defined by said elastic body so that a pressure of the fluid in said pressure-receiving chamber changes due to elastic deformation of said elastic body upon application of the vibrations in said load-receiving direction, and an equilibrium chamber partially defined by said second cylindrical wall portion and said flexible diaphragm so that a volumetric change in said equilibrium chamber is allowed by elastic deformation of said flexible diaphragm; and - means for defining an orifice passage for fluid communication between said pressure-receiving and equilibrium chambers.

2. A fluid-filled elastic mount according to claim 1, wherein said closure member has a stepped cylindrical wall consisting of a large-diameter portion as said first cylindrical wall portion, a small-diameter portion as said second cylindrical wall portion, and a shoulder portion between said large-diameter and small-diameter portions, said large-diameter end portion of said elastic body with said connecting member being received in said large-diameter portion of said closure member.

3. A fluid-filled elastic mount according to claim 2, wherein said second support member has a stepped cylindrical wall consisting of a large-diameter portion, a small-diameter portion and a shoulder portion, which respectively correspond to said large-diameter portion, said small-diameter portion and said shoulder portion of said closure member, said large-diameter portion of said second support member including an inward flange which is caulked so as to extend radially inwards, said caulked portion consisting of said shoulder portion and said large-diameter portion of said second support member.

4. A fluid-filled elastic mount according to claim 1, wherein said sealing rubber layer is formed on said inner circumferential surface of said first cylindrical wall portion of said closure member.

5. A fluid-filled elastic mount according to claim 1, wherein said elastic body has a cavity formed in said large-diameter end portion, to provide at least a part of said pressure-receiving chamber.

6. A fluid-filled elastic mount for flexibly connecting two members, comprising:

a first support member fixed to one of the two members to be flexibly connected;

an elastic body having a generally truncated conical shape and including a small-diameter end portion and a large-diameter end portion, said first support member being secured to said small-diameter end portion of said elastic body;

a cylindrical connecting member secured to an outer circumferential surface of said large-diameter end portion of said elastic body;

a closure member having a generally cylindrical shape closed at one axial end, and including a cylindrical wall portion which is fitted on said connecting member such that an opening of said closure member is fluid-tightly closed by said elastic body, said closure member cooperating with at least said elastic body to define a fluid chamber filled with a non-compressible fluid;

a flexible diaphragm secured to said closure member so as to partially define said fluid chamber;

a sealing rubber layer which is formed on at least one of an outer circumferential surface of said connecting member, and an inner circumferential surface of said cylindrical wall portion of said closure member, such that said sealing rubber layer is sandwiched between said connecting member and said closure member in a direction perpendicular to a load-receiving direction in which vibrations are applied to the elastic mount;

a second support member which is spaced apart from said first support member in said load-receiving direction, and fixed to the other of said two members to be flexibly connected, said second support member being fitted on said closure member and including a caulked portion which retains said connecting member and said cylindrical wall portion of said closure member in said load-receiving direction; and a partition structure supported by said closure member so as to extend in a direction substantially perpendicular to said load-receiving direction, said partition structure dividing said fluid chamber into a pressure-receiving chamber partially defined by said elastic body so that a pressure of the fluid in said pressure-receiving chamber changes due to elastic deformation of said elastic body upon application of the vibrations in said load-receiving direction, and an equilibrium chamber partially defined by said flexible diaphragm so that a volumetric change in said equilibrium chamber is allowed by elastic deformation of said flexible diaphragm;

said partition structure comprising a first and a second partition member which are superposed on each other in said load-receiving direction and which define an orifice passage in a circumferential direction of said partition structure, for fluid communication between said pressure-receiving and equilibrium chambers.

7. A fluid-filled elastic mount according to claim 6, wherein said first and second partition members cooperate with each other to define a flat space, said elastic mount further comprising a flexible film which is supported by said partition structure and is deformably disposed within said flat space, so as to divide said flat space into two sections which communicate with said pressure-receiving chamber and said equilibrium chamber.

8. A fluid-filled elastic mount for flexibly connecting two members, comprising:

a first support member fixed to one of the two members to be flexibly connected;

an elastic body having a generally truncated conical shape and including a small-diameter end portion and a large-diameter end portion, said first support member being secured to said small-diameter end portion of said elastic body;

a cylindrical connecting member secured to an outer circumferential surface of said large-diameter end portion of said elastic body;

a closure member having a generally cylindrical shape closed at one axial end, and including a cylindrical wall portion which is fitted on said connecting member such that an opening of said closure member is fluid-tightly closed by said elastic body, said closure member cooperating with at least said elastic body to define a fluid chamber filled with a non-compressible fluid;

a flexible diaphragm secured to said closure member so as to partially define said fluid chamber;

a sealing rubber layer which is formed on at least one of an outer circumferential surface of said connecting member, and an inner circumferential surface of said cylindrical wall portion of said closure member, such that said sealing rubber layer is sandwiched between said connecting member and said closure member in a direction perpendicular to a load-receiving direction in which vibrations are applied to the elastic mount;

a second support member which is spaced apart from said first support member in said load-receiving direction, and fixed to the other of said two members to be flexibly connected, said second support member being fitted on said closure member and including a caulked portion which retains said connecting member and said cylindrical wall portion of said closure member in said load-receiving direction;

a partition structure supported by said closure member so as to extend in a direction substantially perpendicular to said load-receiving direction, said partition structure dividing said fluid chamber into a pressure-receiving chamber partially defined by said elastic body so that a pressure of the fluid in said pressure-receiving chamber changes due to elastic deformation of said elastic body upon application of the vibrations in said load-receiving direction, and an equilibrium chamber partially defined by said flexible diaphragm so that a volumetric change in said equilibrium chamber is allowed by elastic deformation of said flexible diaphragm;

means for defining an orifice passage for fluid communication between said pressure-receiving and equilibrium chambers; and a stopper member which is fixed to said second support member so as to extend toward said first support member, said stopper member limiting an amount of relative displacement between said first and second support members.

9. A method of manufacturing a fluid-filled elastic mount for flexibly connecting two members, comprising the steps of:

assembling an inner unit consisting of a first support member, an elastic body and a connecting member, such that said first support member is secured to a small-diameter end portion of said elastic body, and such that said connecting member is secured to an outer circumferential surface of a large-diameter end portion of said elastic body;

providing a closure member having a generally cylindrical shape closed at one axial end thereof and including a cylindrical wall portion to be fitted on said connecting member, said cylindrical wall portion having a diameter which gradually increases toward said opening of said closure member;

forming a sealing rubber layer on an inner circumferential surface of said cylindrical wall portion of said closure member;

providing a partition structure having an orifice passage defined therein;

assembling said cylindrical wall portion of said closure member radially outwardly of said connecting member, with a peripheral portion of said partition structure being interposed between said closure member and said connecting member in an axial direction of the elastic mount, and subsequently drawing said cylindrical wall portion of said closure member radially inward so that said cylindrical wall portion is forced against said outer circumferential surface of said connecting member with said sealing rubber layer sandwiched therebetween, whereby said partition structure is supported by said closure member and said connecting member to define a pressure-receiving chamber and a variable-volume equilibrium chamber on opposite sides of said partition member; and fitting a caulked portion of a second support member on said cylindrical wall portion of said closure member, such that said caulked portion is caulked to retain said cylindrical wall portion and said connecting member in said axial direction of the mount.

* * * * *

UNITED STATES PATENT AND TRADEMARK OFFICE
CERTIFICATE OF CORRECTION

PATENT NO. : 5,183,243
DATED : February 2, 1993
INVENTOR(S) : Nobuo Matsumoto

It is certified that error appears in the above-indentified patent and that said Letters Patent is hereby corrected as shown below:

On the Title page, item [21] column 1, change "711,996" to --711,096--.

Signed and Sealed this

Ninth Day of November, 1993

Attest:

BRUCE LEHMAN

*Attesting Officer*  *Commissioner of Patents and Trademarks*